United States Patent
Conwell

[15] 3,672,048
[45] June 27, 1972

[54] STEAM POWERED VEHICLE
[72] Inventor: Phillip J. Conwell, RR #1, P.O. Box 35, Mount Orab, Ohio 45154
[22] Filed: May 25, 1970
[21] Appl. No.: 39,966

[52] U.S. Cl..................................180/67, 122/3, 122/279
[51] Int. Cl............................................................B60k 3/00
[58] Field of Search.........................180/67, 36; 122/3, 279

[56] References Cited

UNITED STATES PATENTS

| 1,920,907 | 8/1933 | La Mont | 180/67 |
| 2,047,080 | 7/1936 | Maniscalco | 165/52 |
| 2,116,718 | 5/1938 | Stubbs | 165/52 X |
| 821,558 | 5/1906 | Wagener | 122/276 |

OTHER PUBLICATIONS

The Doble-Detroit Steam Car, Sept. 22, 1917
The Automobile, " New Burner in Doble Steamer" April 5, 1917, pp. 700– 702

*Primary Examiner*—Benjamin Hersh
*Assistant Examiner*—John P. Silverstrim
*Attorney*—Robert G. McMorrow

[57] ABSTRACT

A passenger automobile or the like is steam power driven by providing a flat planar boiler beneath the passenger compartment and intermediate of the main drive steam turbine and the combustion chamber which, depending upon whether the vehicle is front wheel driven or rear wheel driven, may be located alternatively at the front or rear of the vehicle.

6 Claims, 10 Drawing Figures

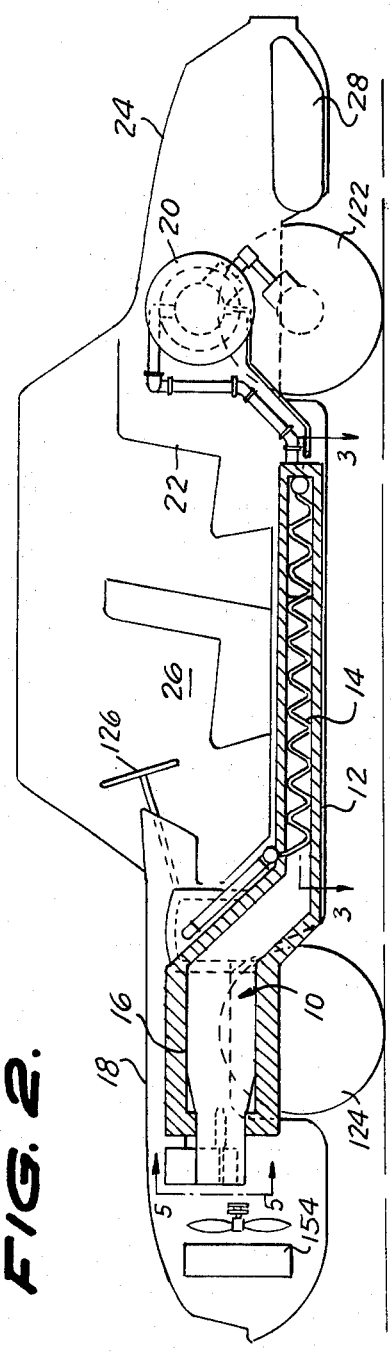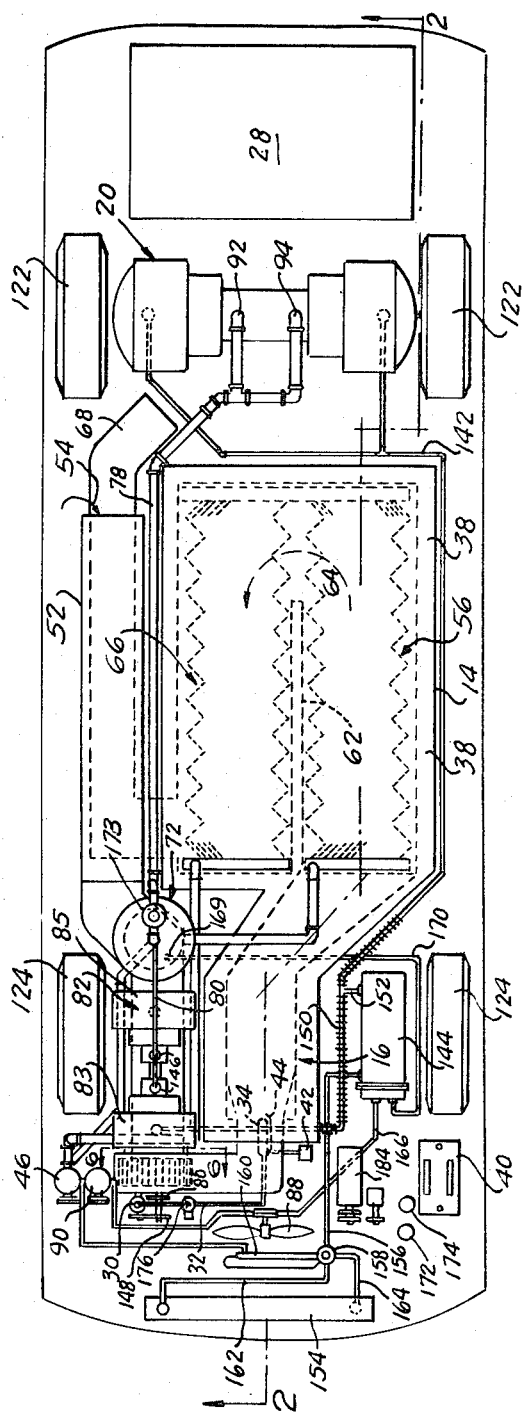

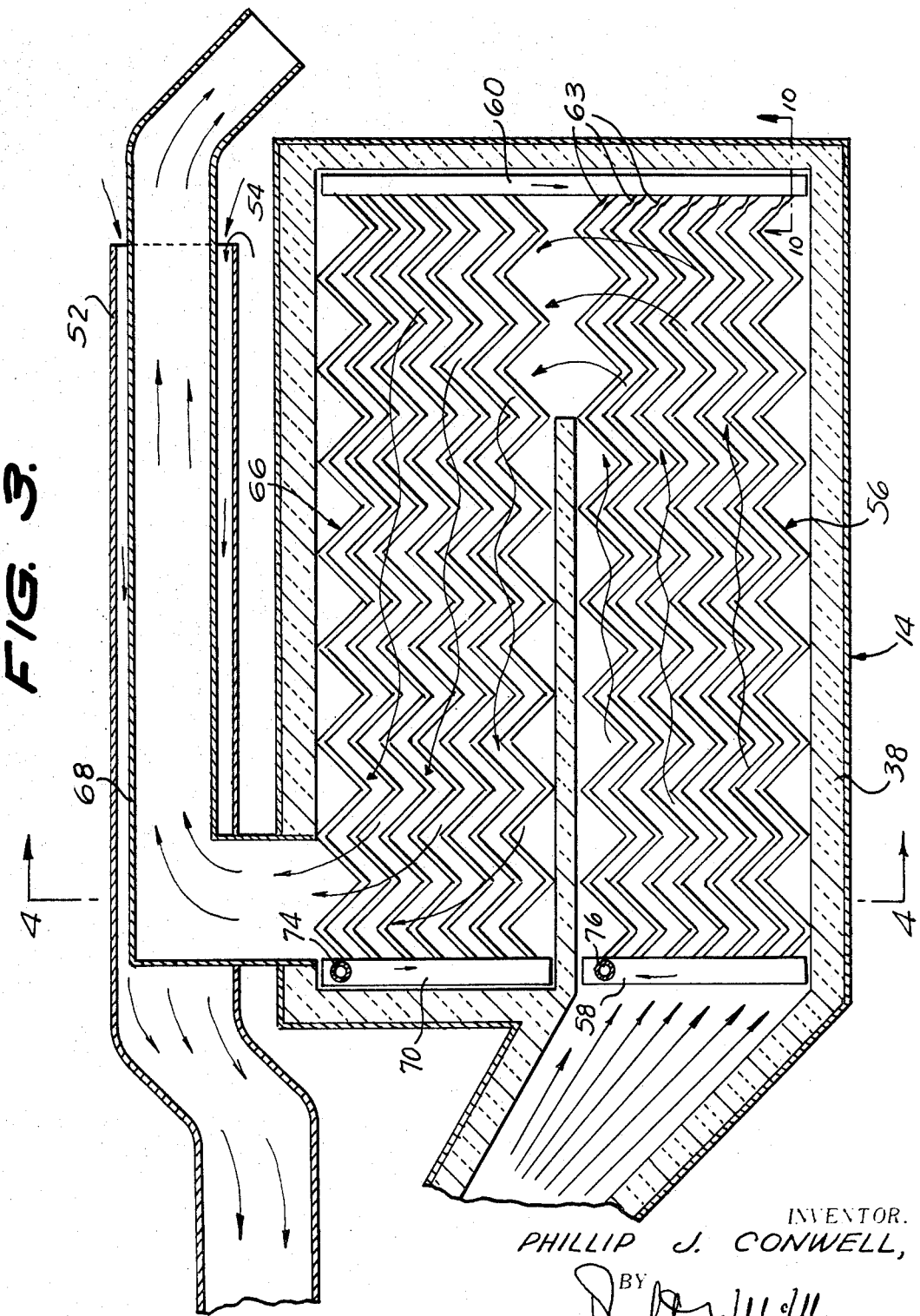

INVENTOR.
PHILLIP J. CONWELL,

BY Betty M. Morrow
ATTORNEY

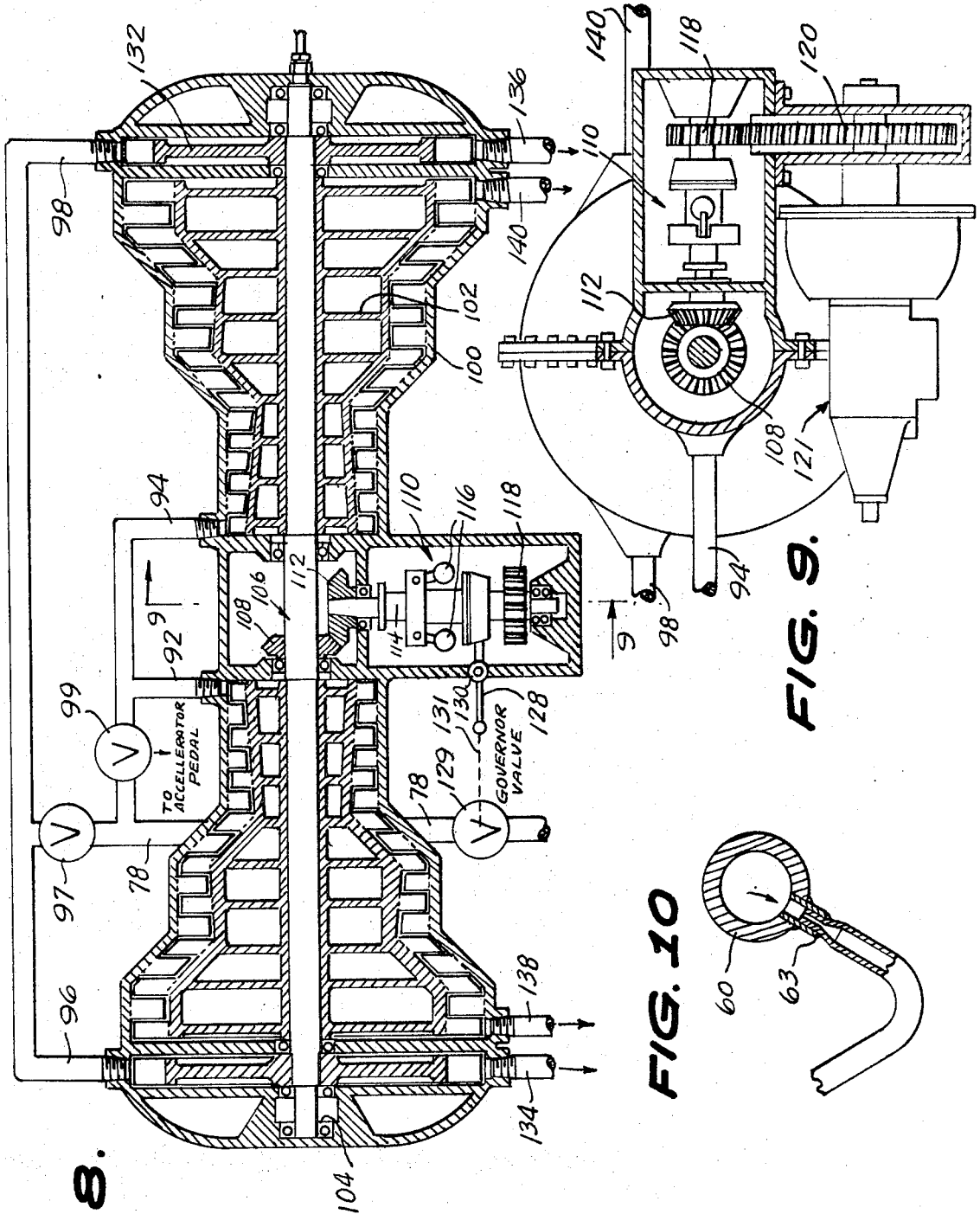
FIG. 8.
FIG. 9.
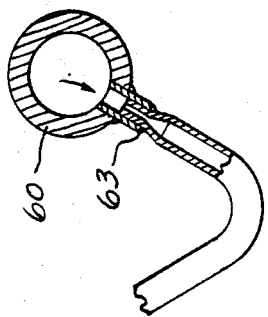
FIG. 10.
INVENTOR.
PHILLIP J. CONWELL,
BY
ATTORNEY

STEAM POWERED VEHICLE

BACKGROUND OF THE INVENTION

1. Field of the Invention

This invention relates to steam power generator units and more particularly to an automotive vehicle incorporating the same.

2. Description of the Prior Art

Because of the great amount of air pollution resulting from extensive use of the internal combustion engine as the power means for automotive vehicles and the like, attempts have been made to construct steam power generating units useful in conventional or altered automotive designs to replace the internal combustion engine as a direct drive method for propelling the vehicle. One of the major problems in producing an economically competitive power unit which will provide sufficient horsepower to compete with the internal combustion engine, involves the position of the boiler associated with the combustion chamber for transforming the heat of the combustion of products into pressurized steam capable of driving the turbine which is, in turn, mechanically coupled to the vehicle transmission system.

In the past, the boiler was either located at the front of the vehicle, that is, in front of the passenger compartment, or within the trunk, depending upon where the combustion chamber was positioned and the turbines for driving the powered wheels.

SUMMARY OF THE INVENTION

The present invention relates primarily to a high capacity, small sized boiler of planar configuration which lies immediately beneath the passenger compartment at the center of the automotive vehicle. This allows the other components of the system to be reversely positioned as desired or, alternatively, both the combustion chamber and the main drive turbine may be placed in the same section of the vehicle, i.e., to the front of or behind the mid section carrying the boiler. Preferably, the combustion air passes in one direction along one side of the boiler, the full length of the same, reverses its direction for passage over another bank of hot water tubes prior to again reversing direction to pass rearwardly through an exhaust duct. Preferably, an enlarged air intake tube concentrically surrounds the exhaust duct to preheat the combustion air prior to entering the combustion chamber. The combustion chamber may be centrally located in the front portion of the automobile, beneath the hood, for direct passage of the products of combustion onto one of the banks of the hot water tubes. The boiler heats the water under pressure which then enters a separate steam drum above the water level in the drum bottom, with the water flashing into steam which is then directed to a primary turbine at the rear of the vehicle and within the trunk, with this turbine acting as the main drive turbine and coupled mechanically to a rear wheel transmission system. An auxiliary turbine at the front of the vehicle adjacent the combustion chamber selectively receives steam to drive the generator, burner fan, condenser fan, condensation pump, boiler water circulating pump, fuel oil pump, and to power the hydraulic pumps for the brakes and steering and/or the air conditioning unit of the vehicle. Primary condensation of the steam occurs in a condenser located at the front of the vehicle, replacing the conventional internal combustion engine cooling liquid radiator. Preferably, the steam is initially forced through a heat exchanger, then to the condenser and back to the heat exchanger, to precool the exhaust steam condensate from the turbine prior to entering the condenser. Water from the condenser is pumped by the condensate pump through the heat exchanger where the water is warmed prior to entering the bottom of the steam drum. A water makeup tank and drum replenishes water into the steam drum to maintain the water level at an established limit. The vehicle ignition switch controls a solenoid valve which in turn controls delivery of fuel oil to the combustion chamber burner. A pressure controlled switch, responsive to pressure in the steam line at the top of the steam drum, operates a variable mechanical valve in the fuel line and also reduces the volume of air in the intake duct by control of louvers, thus reducing the supply of fuel and air to the combustion chamber when pressure increases above the limit value. A heat sensor, located between the boiler and the exhaust duct, senses boiler temperature to terminate delivery of fuel when the temperature is above a limit value. A thermocouple on a header close to the tubes actuates a solenoid valve in the fuel oil line to terminate the supply of the same if the heat exchange tubes become excessively hot. A capillary tube in the line from the condenser to the condensate pump and thence to the bottom of the stream drum senses the condensed water temperature to operate a four-way valve controlling the return of the exhaust steam condensate from the turbine so as to bypass the condenser and feed the turbine exhaust steam condensate directly through the heat exchanger to the condensate pump, allow full flow of the turbine exhaust steam, first through the heat exchanger, and then to the condenser prior to entering the steam drum via the condenser pump, or provide partial flow to the condenser and through the bypass to the condenser pump.

BRIEF DESCRIPTION OF THE DRAWINGS

FIG. 1 is a plan view of the steam power generating unit of the present invention as applied to a rear wheel driven automobile of conventional design;

FIG. 2 is an elevational, sectional view of the vehicle of FIG. 1, taken about lines 2—2;

FIG. 3 is a plan view, in section, of a portion of the steam power unit of FIG. 2, taken about lines 3—3 and illustrating, in particular, the boiler;

FIG. 8 is a sectional view of the primary drive turbine shown in FIGS. 1 and 2;

FIG. 9 is a sectional, elevational view of a primary drive turbine shown in FIG. 8, taken about lines 9—9; and FIG. 10 is a partial sectional view of a fluid restrictor carried by each tube of the left bank of FIG. 3.

DESCRIPTION OF THE PREFERRED EMBODIMENT

Figure 4:
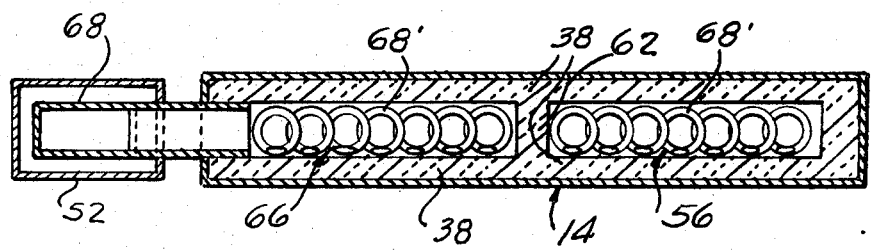
FIG. 4 is a sectional, elevational view of the boiler shown in FIG. 3, taken about lines 4—4.
Figure 5:
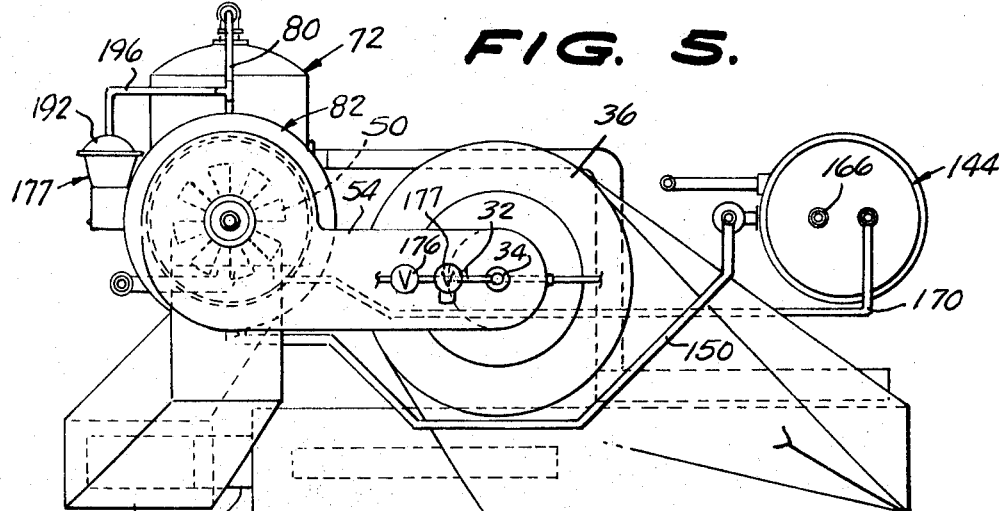
FIG. 5 is a front elevational view of a portion of the unit illustrated in FIGS. 1 and 2.

The steam power generating unit of the present invention is particularly applicable to the contemporary passenger automobile and, as illustrated in FIGS. 1 and 2, the generating unit 10 is adapted to fit the existing space within a conventional automotive vehicle 12, in this case the vehicle is of the rear wheel driven type. As such, the three principal components of the power unit comprise an intermediate boiler 14, an axially aligned combustion chamber 16 at the front end of the vehicle, beneath hood 18, and a primary drive turbine 20 positioned in the rear of the vehicle, behind the rear seat 22 and lying beneath it to the front of trunk area 24. As such, the boiler, which is flat and planar in form and constituting a thin rectangular unit, lies directly beneath the passenger compartment 26 and extends generally the major part of the width and length of the same. Boiler 14 constitutes a high capacity, small size unit occupying a small space, such as that existing beneath the mid section of an automobile. Of course, the complete unit may be otherwise reversed, with the combustion chamber positioned at the rear of the vehicle and the main drive turbine placed at the front of the vehicle or, alternatively, both major units may be placed in the same end of the vehicle.

While the present steam power generating unit of the present invention is illustrated as being particularly applicable to the automotive field and, in particular, a conventional passenger automobile, it is obvious that the unit may be employed to propel any type of land service, utility, convenience or recreational vehicle or any type of water craft or aircraft which requires a pushing or pulling propeller. Further, while the steam power generating unit is illustrated as powering a personal vehicle, such as an automobile, it may readily power mass transit type vehicles, even mass transit rail system vehicles which employ multiple sets of main drive turbines, depending upon the size of the vehicle, or multiple vehicles of an articulated nature.

The power generating unit burns conventional fuel oil, kerosene, common petroleum fuels, gaseous powdered coal, and nuclear materials, although, in the illustrated embodiment, a fuel tank 28, located conventionally at the rear of the vehicle within the trunk area 24, supplies fuel through a line (not shown) to a fuel oil pump 30, which pressurizes the same and delivers fuel through tube 32 to the fuel burner nozzle 34 positioned within combustion chamber 15. In this respect, the combustion chamber 16 and the boiler 14 are surrounded by thermal insulation 38 to reduce heat loss. A conventional battery 40 supplies the necessary electrical power to the ignition coil 42 and electrode 44 within the combustion chamber 16. Means further operate the fuel oil pump 30, the boiler water circulating pump 46, the burner fan or blower 50. The fuel oil pump 30 in turn pumps oil into the combustion chamber 36 while the burner fan or blower 50 forces air under pressure into the combustion chamber for mixing with the fuel while the ignition of the fuel air mixture occurs through electrode 44. Meanwhile, the boiler water circulating pump 46 circulates water in the closed water/steam circuit.

In this respect, the combustion air enters the rear end of air intake duct 52, as indicated by arrows 54, under suction pressure and passes radially outward from the vanes of the blower 50, discharging into lateral duct 54 where it makes a left turn to enter the combustion chamber 16. Combustion of the fuel air mixture in the combustion chamber 16 raises the temperature of the air in the chamber due to combustion of the same. As a result of operation of air blower 50, the hot air and combustion products pass into the boiler tube and air pass compartment or boiler 14 passing over the left tube bank section 56 comprising a plurality of tubes in serpentine fashion which extend and fluid connect inlet header 58 and common header 60, FIG. 3. After heating the boiler tubes in the left bank 56, the heated air passes around the end of longitudinal baffle 62 which partially separates the left tube bank section and the right tube bank section 66, as indicated by arrow 64, FIG. 1. Then, the heated air continues under pressure of the blower 50, and is forced over and around the tubes in the right tube bank section 66 of the compartment. After the heated air passes over and around all of the coils 68', making up both bank sections, the heated air leaves the boiler tube and air pass compartment 14 through exhaust duct 68 and is discharged to the atmosphere. As the heated air is forced through the boiler tube and air pass compartment in the direction prescribed, from the left boiler tube bank to right boiler tube bank, the water, which enters header 70, flows in the opposite direction through the boiler tube and air pass compartment from header 70 through the right tube bank 66, to common header 60 at the rear of the compartment, and then through the left bank section 56 to the left bank header 58. Fluid restrictors 63 are carried by the tubes of bank 56 adjacent common header 60, FIG. 10. The boiler tubes 68' forming the same remain full of water and the steam drum 72 contains water in its bottom portion. The water is forced by boiler water circulating pump 46 into header 70 at the front end of the right boiler tube bank 66, and through the header 70 into the individual boiler tubes 68' making up the same. In the right tube bank 66, the water temperature is raised to a continuously higher degree as the water progresses through the tubes toward the rear of the bank (as the tubes become closer to the heat source). At the rear of the boiler tube banks, the heated water enters the common header 60, joining the right and left boiler banks together and the heated water crosses over to the left boiler tube bank 56, enters the individual tubes 68' carried thereby, with the water being heated to a still higher degree as it approaches the heat source (combustion chamber 16). Having reached maximum temperature at the forward end of the left boiler tube bank 56, the heated water enters header 58 which is located at the forward end of the left boiler tube bank. From this header 58, the water is forced into the steam drum via drum delivery tube 76 which enters the steam drum 72 at approximately its mid section. As the heated water enters the steam drums, above the water level in the drum bottom, the water flashes into steam since the water in the boiler tubes is at a pressure 50 to 60 pounds higher than the pressure existing in the steam drum.

A particular feature of the present invention is the preheating of the combustion chamber air supply via the concentric arrangement between the air intake tube 52 and the combustion products exhaust tube 68 which extends axially through the same and is spaced slightly from the larger diameter intake tube 52. Thus, as the heated air leaves the boiler tube and air pass compartment or boiler 14, the air flows through the exhaust duct 68 which extends through the center of the air intake duct or tube 52. The incoming air is warmed causing better combustion by preheating the air.

Steam is delivered from the steam drum 72 to the unit 10 at two places. Steam passes via two steam delivery tubes 78 to the main drive turbine 20 which powers the vehicle into motion while additional steam is delivered via auxiliary tube 80 to the auxiliary turbine 82. The auxiliary turbine mechanically powers such auxiliary equipment as the generator 184 by pulley and belt means (not shown), the burner fan or blower 50 via shaft 86, the condenser fan 88, the condensate pump 90, the boiler water circulation pump 46, the fuel oil pump 30, and hydraulic pumps for brakes and steering and air conditioning components (not shown). Components 30, 46, 84, 88, and 90 are illustrated schematically as having pulleys although none of the belts coupling the same to drive shaft 86 are shown. These components, while necessary to the system, are employed within the present system of the invention in conventional fashion.

Steam thus leaves the outlet in the top of the steam drum 72 and passes to the main drive turbine 20 through a delivery or feed line 78 which extends through the boiler tube and air pass compartment or boiler 14, due to its thermal insulation 38 (on vehicles with the steam drum and drive turbine on opposite ends of the vehicle) to the main drive turbine 20. Steam drum 72 carries pressure relief valve 173. The steam is then delivered over four feeder lines, two main feeder lines 92 and 94, and auxiliary lines 96 and 98.

Reference to FIG. 8 illustrates the operation of the dynamic and statically balanced main drive turbine. The turbine 20 comprises an outer stator section 100 which may be of cast metal or the like and which supports, for rotation, an inner rotor 102 with the stator shaft 106 being supported by various bearings 104 throughout its length. Sealing means are provided and, essentially, the majority of the steam expands and passes outwardly from the center through the labyrinth of stator and rotor blade passages, causing rotation of the rotor shaft 106 which in turn carries bevel spur gear 108. Gear 108 is directly steer the vehicle under control of a conventional steering wheel axially shiftable, centrifugally operated governor 110 through a driven spur gear 112 mounted on shaft 114. Centrifugal weights 116 operate to shut off flow of steam to the turbine by means of a valve 129 via mechanical linkage 131. At the opposite end of shaft 114 from the bevel spur gear 112, should the turbine start to overspeed. Gear 118 in turn meshes with speed reduction gear 120 in turn coupled to the rear wheel drive shaft for rear wheel 122 via fluid drive transmission means 121. Thus in this case, the front wheels 124 are free-wheeling and steering wheel 126. Lever 128 is employed for closing valve 129 with lever 128 pivoting on pin 130. The turbine is disconnected by means of a shifting lever mounted on the steering column or on the floor. That is, when the lever operates the gears in the transmission, the turbine is disconnected at the same time and point. When the transmission is in neutral, the turbine is disconnected (see FIG. 9), the auxiliary steam feed lines 96 and 98 are employed to deliver steam under pressure, and independently, through reversely oriented, single-stage turbine blades 132 coupled to the rotor shaft. Reverse blade steam control valve 97 selectively directs steam thereto. The steam then passes to respective outlets 134 and 136 on right and left hand sides of the vehicle. Most of the steam passes via main feeder lines 92 and 94 to the turbine sections intermediate of rotor blades 132 and exits through return lines 138 and 140. The path of the steam through the respective lines and the turbine itself is illustrated by the various arrows in FIG. 8. Thus, for primary vehicle movement, steam enters the main drive turbine 20 through the two center feeder lines 92 and 94 and, in expanding, forces the turbine rotor 102 to rotate. The accelerator pedal (not shown) operates the control valve and thus permits the operator to control the main drive turbine speed as desired. As the rotor rotates, the vehicle is propelled through gears on the rotor shaft which drive the drive gear, the transmission and the differential in the same manner as a conventional automotive transmission system. As the control on the free-wheeling of the turbine rotor, the main drive turbine has one reversed vane or blade on each end of the rotor, these constituting vanes 132, with steam being supplied to the reverse vanes through the two outermost feeder lines 96 and 98. Delivery of the steam to the auxiliary or special feeder lines 96 and 98 is under control of the vehicle operator through valve 97 and may be accomplished in any one or all of three ways. Control may be coupled via linkage to the brake pedal (not shown), or by further linkage the accelerator pedal (not shown), and by linkage to a manual control for use when descending steep grades. Thus, the application of steam to the reverse blades tends to drive the turbine rotor in a direction opposite to that with which it is normally driven by delivery of steam through the primary feeder lines 92 and 94.

In any case, regardless of how steam is applied to the turbine, the steam leaves the main drive turbine 20 through the exhaust ports 134, 138, 140, and 136 in the low pressure end of the turbine casing and passes through an appropriate common return line 142 to the heat exchanger 144 located to one side of the combustion chamber 16 and forward of the boiler 14.

As mentioned previously, some of the steam passes via line 80 to the auxiliary turbine 82, turbine 82 comprising two duplicate units 83 and 85, each receiving steam via independent feeder line 146. As the rotor of the auxiliary turbine rotates, the rotor shaft 86, extending through each end of the turbine casing, rotates pulley 148 to power the auxiliary equipment. Steam leaves the auxiliary turbine 82 through two exhaust ports in the lower pressure ends of the turbine casing and passes through line 150 where the return steam is delivered to heat exchanger 144 along with steam from line 142 through a common inlet tube 152.

Thus, the steam which is exhausted from the main drive turbine 20 and the auxiliary turbine 82 is forced through the heat exchanger 144 and then the condenser 154 via line 156. A four-way valve 158 is positioned in this line and is connected to heat exchanger delivery line 156, condensate pump delivery line 160, condenser supply line 162, and condenser return line 164. Condenser supply line 162 delivers exhaust steam from the turbine after its passage through heat exchanger 144 to the inlet side of the condenser 154, while condenser outlet line 164 delivers the condensed liquid back to the heat exchanger 144 after first passing through the condensate pump 90 which causes the condensed liquid to move under pressure through line 166, and from the heat exchanger 144 directly to the bottom through inlet 169 of the steam drum 72, via return line 170. Thus, primary condensation occurs in the condenser 154 where the steam is returned to water with the cooling effect of the ambient temperature air being forced over the condenser coils through the suction pressure created by operation of the cooling air fan 88. The heat exchanger 144 assists in the condensing process by passing the cooler water, coming from the condenser, via lines 164, 160, and 166, past the exhausted steam within heat exchanger 144 which enters inlet 152 to the heat exchanger and passes via line 156 to the four-way valve 158 prior to entering condenser 154 through inlet line 162. The effect, therefore, is precooling of the exhausted steam prior to entry into the condenser. Water leaving the condenser is pumped by the condensate pump 90 through the heat exchanger 144 in a reverse path where the water is warmed when it passes by the exhaust steam on its way to the condenser 154. The warmed water is then forced back to the bottom of the steam drum 72 through line 170 and inlet 169 thereto.

Since the water supply for steam generation is limited in a closed circuit system, two water control features are employed in the present invention. A water makeup tank and pump 172 is preferably employed for replenishing the water into the steam drum should the water level recede below an established limit due to leakage or the like and, by the provision of sealed-water collection lines and a pump 174 which pumps water that may leak at critical points back into the steam drum 72.

Figures 6, 7:
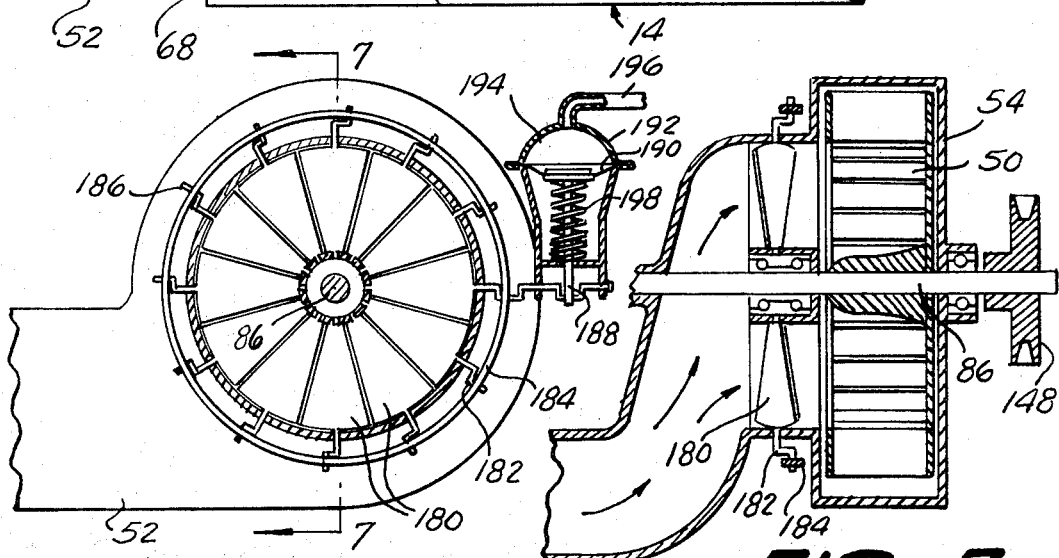
FIG. 6 is a sectional view, taken about lines 5—5 of FIG. 2.
FIG. 7 is a sectional, elevational view of a portion of the blower illustrated in FIG. 5.

To assure that the boiler 14 is always operated under control, additional controls are placed on the fuel supply line, the air intake duct 52, and the exhaust duct 68. A solenoid valve 177 is placed in the fuel oil supply line 32 and is operated by closing and opening the vehicle ignition switch. Further, pressure control sensor 176 is coupled to the steam line 78 at the top of the steam drum and when excessive pressure is achieved, the control sensor operates the variable mechanical valve 176 in the fuel line and further dampens air in the intake duct by control of louvers or vanes, thus reducing the supply of fuel oil and the air to the combustion chamber. Reference to FIG. 6 illustrates the provision of a series of vanes or louvers 180 which are pivotably supported in a circumferential array within duct 52 at the entrance to the blower 50. Further, each of the vanes 180 includes an L-shaped operating lever 186 which is coupled to a wire ring 184 which in turn is actuated by a crank arm 186. The crank arm is coupled to a reciprocating shaft 188, coupled at its opposite end to a pressure operated diaphragm 190 which forms, in conjunction with casing 192, a chamber 194, which is fluid coupled via tube 196 to the top of the steam drum. When excessive fluid pressure occurs within the steam drum 72, the diaphragm 190 is forced downwardly, moving the blades to the closed position shown in FIG. 6. When the pressure decreases, a coil spring 198 on the opposite side of the diaphragm forces the vanes toward open position, allowing the incoming air to be forced into the combustion chamber in response to operation of the blower wheel 50. An additional mechanical connection may be made from the operating shaft 188 to the variable mechanical valve 176 carried by the fuel line for reducing or completely shutting off the delivery of fuel to nozzle 34 within the combustion chamber 16.

The same valve 176 may also be coupled to a heat sensor (not shown) located in the zone between the boiler tube and air pass compartment or boiler 14 and the exhaust duct 68 which heat sensor tends to reduce the supply of oil to the burner nozzle 34, should the boiler 14 become overheated. Finally, a thermocouple on the header line, close to the individual tubes, operates in response to an excessively high temperature to actuate valve 177 and to terminate the supply of fuel to the combustion chamber if the temperature of the individual water tubes become too high.

From the above description, it is obvious that t the steam power unit of the present invention constitutes a practical, safe, and economical method of producing an operable steam powered vehicle. In particular, the construction of the boiler is particularly applicable to an automotive vehicle of conventional design while providing a large enough heat transfer area to supply steam in enough quantity to power a turbine of sufficient size to not only propel the vehicle at required speed and power desired, but allow some of the steam to be diverted to powering auxiliary equipment and all of this is accomplished without reaching critical pressures and temperatures. The power generating unit of the present invention may readily operate from 100 to 1,000 psi or even higher although it is intended to operate from 100 to 300 psi, thereby allowing the use of available antifreeze as an additive to the boiler water for cold weather protection.

Due to the inefficient mixture of oxygen and the combustives in the fuel and the lack of a sufficiently high temperature and time for burning, the internal combustion engines presently employed in the automotive field that use either gasoline, diesel fuel or propane, are incapable of complete combustion, thereby admitting pollutants to the atmosphere. There well may be a complete prohibition of the use of internal combustion engines in the future and it is with this thought in mind that the present invention becomes even more useful since, with the external combustion steam generating unit as set forth above, it is possible to obtain a more complete combustion due to the higher temperature maintained in the combustion chamber and the more efficient mixture of oxygen and fuel combustives. Further, with the external combustion engine of the present invention, the choice of fuels is relatively unlimited and fuels which are void of additives may be readily employed while, in present internal combustion engines designed, it is necessary in many cases to provide additives to the fuel, such as lead to slow down detonation. The steam powered generating unit of the present invention thus supplies the power required for most conventional vehicles, with maximum economy and, at the same time, eliminates the noise vibrations and, more importantly, the pollutants harmful to the health of the nation which are characteristic of the internal combustion engine type of automotive vehicles.

The boiler and turbine are constructed to comply with the National Steam Boiler and National Steam Engine and Turbine Codes, respectively. For example, a relief valve would be on top of the steam drum. The starter motor is connected to the auxiliary turbine shaft by a clutch device which permits it to not run the generator; it permits the starter motor to remain stationary when not in use. The restrictor nozzles are a unique and necessary feature of this boiler. The proper location and size of the nozzles is essential to the boiler operation. Without the restrictor nozzles, the boiler would be of no use as it would not operate properly (see FIG. 3). No boiler is constructed exactly like this boiler. Combustion is completed before the hot gases come into contact with the cooling affect of the tubes, thereby eliminating carbon monoxide.

What is claimed is:

1. In an automotive vehicle having a passenger compartment intermediate of the front and rear wheels thereof, a steam turbine geared to one set of said wheels and having an external combustion chamber for generating thermal energy, a high capacity, small size pancake type boiler underlying said passenger compartment for transferring heat from the products of said combustion chamber to recirculated water carried by said boiler for in turn generating the steam necessary to drive said turbine, the improvement comprising:

said pancake boiler comprising a thin, rectangular insulated casing, extending generally the width of and the length of the passenger compartment of the vehicle,
said combustion chamber lying at the forward end of said vehicle, the rear end of said combustion chamber being coupled directly to the inlet end of said boiler,
a longitudinally extending baffle wall extending the major length of the boiler to define two parallel counterflow passages for the products of combustion,
a water outlet header carried at the forward end of the passage which opens up directly into the rear of the combustion chamber,
a water inlet header carried at the front end of said second passage,
a common header at the rear end of both passages,
two banks extending respectively between said front and rear headers in respective counterflow passages to fluid couple said common header to said water outlet header and said water inlet header,
a gas outlet passage near the front end of said second passage,
an exhaust duct fluid coupled to said outlet passage and extending rearwardly along one side of said boiler,
a duct concentrically carried in spaced parallel fashion by said exhaust duct and connected to said combustion chamber for delivering preheated combustion air thereto,
a blower carried by said air duct for forcing combustion air under pressure into said combustion chamber and thence through said boiler to said exhaust duct,
a condenser carried by said vehicle for cooling the exhaust steam from said turbine and condensing the same,
a steam drum fluid coupled to said condenser for receiving condensate,
means fluid coupling said inlet and outlet headers,
means for circulating water under pressure from said steam drum to the tube banks of said boiler for heating the same,
whereby said high pressure heated water returning from said boiler to said steam drum flashes into steam upon entering the same, and
means for directly connecting the steam drum to said turbine for delivering steam thereto.

2. In an automotive vehicle having a passenger compartment intermediate of the front and rear wheels thereof, a steam turbine geared to one set of said wheels and having an external combustion chamber for generating thermal energy, a high capacity, small size pancake type boiler underlying said passenger compartment for transferring heat from the products of said combustion chamber to recirculated water carried by said boiler for in turn generating the steam necessary to drive said turbine, the improvement comprising:

said pancake boiler comprising a thin, rectangular insulated casing, extending generally the width of and the length of the passenger compartment of the vehicle,
said combustion chamber lying at the forward end of said vehicle, the rear end of said combustion chamber being coupled directly to the inlet end of said boiler,
a longitudinally extending baffle wall extending the major length of the boiler to define two parallel counterflow passages for the products of combustion,
a water outlet header carried at the forward end of the passage which opens up directly into the rear of the combustion chamber,
a water inlet header carried at the front end of said second passage,
a common header at the rear end of both passages,
two tube banks extending respectively between said front and rear headers in respective counterflow passages to fluid couple said common header to said water outlet header and said water inlet header,
a gas outlet passage near the front end of said second passage,
an exhaust duct fluid coupled to said outlet passage and extending rearwardly along one side of said boiler,
a duct concentrically carried in spaced parallel fashion by said exhaust duct and connected to said combustion chamber for delivering preheated combustion air thereto,
a blower carried by said duct for forcing combustion air under pressure into said combustion chamber and thence through said boiler to said exhaust duct,
a condenser carried by said vehicle for cooling the exhaust steam from said turbine and condensing the same,
a steam drum fluid coupled to said condenser for receiving condensate,
means fluid coupling said inlet and outlet headers,
means for circulating water under pressure from said steam drum to said tube banks of said boiler for heating the same,
whereby said high pressure heated water returning from said boiler to said steam drum flashes into steam upon entering the same,
means for directly connecting the steam drum to said turbine for delivering steam thereto, a heat exchanger fluid coupled to said turbine exhaust line and said condenser, and having first closed fluid passages for receiving steam exhausted from said turbine prior to entering said condenser, and having other fluid passages in heat exchange relationship thereto for receiving condensed steam from said condenser prior to return to the steam drum, whereby said exhaust steam prewarms the condenser water entering said steam drum, a condensate pump for pumping condensed water under pressure to said steam drum, and selectively operated valve means to direct exhaust steam from the turbine through the heat exchanger, and directly to the condensate pump to bypass the condenser, or to direct all, some, or none of the turbine exhaust steam from the heat exchanger to the condenser, and thence to the pump for return through the heat exchanger to the steam drum.

3. The vehicle as claimed in claim 2 further comprising a thermostat operatively coupled to the inlet side of the condenser pump for controlling said multiple position valve means.

4. The vehicle as claimed in claim 3 further comprising; a plurality of shiftable vanes positioned within said combustion air intake duct and to one side of said blower wheel, and pressure responsive means mechanically coupled to said vanes and responsive to steam pressure in said steam drum for controlling the position of said vanes whereby air flow to said combustion chamber is damped in the intake duct by closing the vanes in response to excessive steam pressure.

5. The vehicle as claimed in claim 4 wherein said air intake duct includes a cylindrical passageway, said shiftable vanes comprise a radial array within said passageway and at right angles to the axis thereof, crank arms carried at the outer ends of said vanes, a common operating ring coupled to said crank arms, and said pressure responsive means comprises a casing carrying a spring biased, movable diaphragm and defining a closed chamber fluid coupled to said steam drum, an actuating shaft extending from said diaphragm through said casing wall and mechanically coupled to said common actuating means, whereby; said spring tends to move said diaphragm and said operating shaft to a vane full open position while fluid pressure acting on the opposite side of said diaphragm tends to move said vanes to fully closed position.

6. An automotive vehicle comprising a centrally located passenger compartment intermediate of the front and rear wheels thereof, a steam turbine overlying the set of rear wheels and geared thereto for driving the same, an external combustion chamber at the front of said vehicle and a pancake boiler comprising a rectangular insulated casing extending generally the width and length of the passenger compartment of the vehicle and lying underneath the same with the front end opening into said combustion chamber for free passage of the combustion products into said boiler, a longitudinal baffle separating said boiler into two parallel counter flow gas passages, headers carried at respective ends of said passages and water heating tube banks extending between said headers and in the path of said combustion products, an exhaust duct coupled to said boiler at the front end and extending rearwardly along one side of said boiler for exhausting said combustion products from said vehicle, a large diameter intake duct concentrically positioned about said exhaust duct and spaced therefrom to define an air intake passage running counter flow to said exhaust duct passage, a blower carried by said combustion air intake passage for delivering air under pressure to said combustion chamber and thence to said boiler for effecting heat transfer to the water within said bank of tubes, a condenser carried at the forward end of said vehicle, a steam drum, a heat exchanger, conduit means for delivering exhaust steam from said turbine through said heat exchanger to said condenser and back through said heat exchanger to said stream drum, and a four-way valve for selectively directing exhaust steam from said turbine through said heat exchanger, said condenser, and via a separate return path through said heat exchanger to said steam drum, or to fully or partially bypass said condenser, and means responsive to the temperature on the inlet side of said condensate pump for varying the position of said four-way valve.

* * * * *